J. H. GUGLER.
COMBINED PRIMARY AND SECONDARY BATTERY SYSTEM.
APPLICATION FILED NOV. 26, 1909.
979,155.
Patented Dec. 20, 1910.
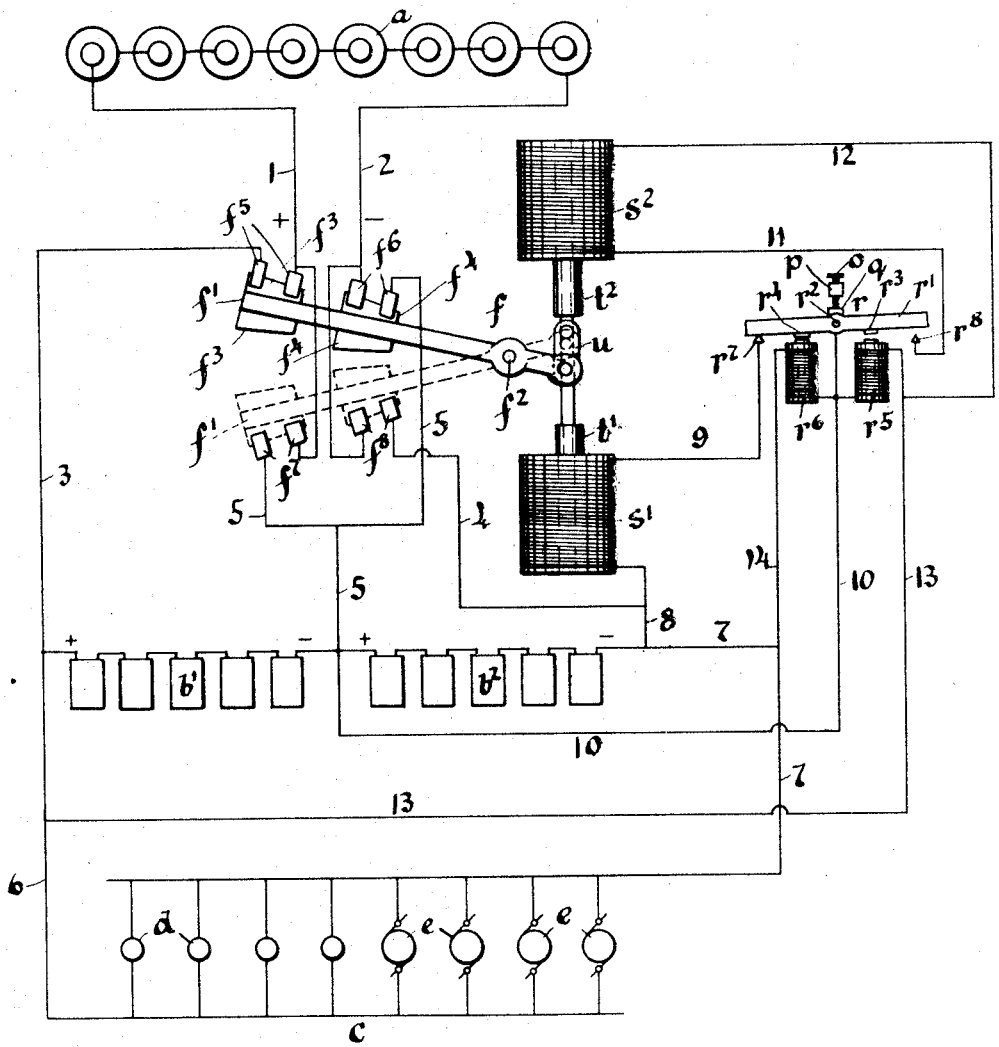

UNITED STATES PATENT OFFICE.

JULIUS H. GUGLER, OF MILWAUKEE, WISCONSIN.

COMBINED PRIMARY AND SECONDARY BATTERY SYSTEM.

979,155.  Specification of Letters Patent.  Patented Dec. 20, 1910.

Application filed November 26, 1909. Serial No. 529,994.

*To all whom it may concern:*

Be it known that I, JULIUS H. GUGLER, of Milwaukee, Wisconsin, have invented a Combined Primary and Secondary Battery System, of which the following is a specification.

The present invention relates to a combined primary and secondary battery system and the object which I have in view is to provide means whereby a given primary battery may be made to supply a service-circuit at double its own voltage.

Furthermore I aim to provide automatic means for its operation whereby all hand or manual attention is obviated.

My invention comprises in its general principle the use, in combination with a primary battery of given voltage, of a secondary or storage-battery of double that voltage which is in two equal halves permanently connected in series to the service-circuit, and means for alternately connecting first one half and then the other of said storage-battery in circuit with the primary battery and thereby charging each half alternately.

Furthermore I provide electrically operated means depending upon the voltage of the respective halves of said secondary battery for shifting the primary battery from one half to the other half when the first half is charged up to a given predetermined potential.

The nature of my invention will best be understood from the accompanying drawing which illustrates the connections and arrangement of elements diagrammatically.

In this drawing a primary battery of any desirable number of cells is shown at $a$, and a secondary battery at $b'$, $b^2$, these reference-letters designating the two halves in which the battery is divided; while $c$ represents a service-circuit containing any means for consuming the electric power generated, such as lamps $d$ and motors $e$.

In the connections between the primary and secondary battery is interposed an electrically operated changeover-switch $f$, which may be mechanically constructed in various ways, that shown being merely schematic in its nature and for the purpose of clearly illustrating the operation upon a single plane. The switch-blade $f'$ of insulating material is pivoted at $f^2$ and carries two pairs of contact-strips $f^3$, $f^4$, or said switch-blade may be made of metal and the contact-strips insulated therefrom. These contact-strips are adapted to join electrically in pairs the four pairs of contact-pieces $f^5$, $f^6$, $f^7$, $f^8$, disposed on opposite sides of the blade. A lead 1 connects one pole of the battery $a$ which we will consider for the sake of fixing ideas as the positive pole, to one of the contact-pieces $f^5$ and also one of the contact-pieces $f^7$; while another lead 2 connects the other or negative pole of the battery $a$ to one of the contact-pieces $f^6$ and also to one of the contact-pieces $f^8$. Further the positive pole of the secondary battery $b'$ is connected by a lead 3 with the other contact-piece $f^5$ and the negative pole thereof by a lead 4 to the other contact-piece $f^8$. Finally the intermediate pole of the battery $b'$, $b^2$, that is to say the negative pole of the portion $b'$ and the positive pole of the portion $b^2$ is connected by a lead 5 to the remaining contacts $f^6$ and $f^7$.

A consideration of the effect of the above connections will show that when the switch-blade $f'$ is in the position shown in full lines in the drawing, the primary battery $a$ is connected in circuit with the battery-half $b'$ so as to charge the same, while the battery half $b^2$ is disconnected therefrom; while when the switch-blade $f'$ is shifted to the opposite side, shown in dotted lines in the drawing, the primary battery $a$ will now be connected in circuit with the battery-half $b^2$ to charge the same, while the primary half $b'$ will be out of circuit. This change takes place without any interference with the service-circuit, which is constantly connected in circuit with both halves of the battery $b'$, $b^2$ by means of leads 6 and 7.

The means which I employ for shifting the switch $f$ automatically is as follows: A pair of electromagnetically operated devices such as solenoids $s'$, $s^2$, are connected with the switch-blade $f'$ in such a manner that when one of said devices is energized it will throw the switch-blade $f'$ in one direction and when the other is energized it will throw said switch-blade in the other direction. This is illustrated by providing the two solenoid-cores $t'$, $t^2$, with a link connection $u$ to the switch-blade $f'$. Now the solenoids $s'$, $s^2$ are connected up in circuit either with one of the batteries, or any other source of current, as by means of leads 8, 9 and 10 in the case of the solenoid $s'$, and the leads 10, 11 and 12 in the case of the solenoid $s^2$. In these connections is interposed a relay-switch $r$, which also may be made in many different forms mechanically, but is represented for the sake of illustration as having an oscillating arm $r'$ pivoted at $r^2$ and carrying armatures $r^3$ and $r^4$ to two relay-magnets $r^5$ and $r^6$ which are connected respectively with the two battery-halves $b'$ and $b^2$ by means of leads 10 and 13 in the case of the relay $r^5$, and leads 10 and 14 in the case of the relay $r^6$. The oscillating arm $r'$ forms one element of the electric circuit to the two solenoids, and coacts with a pair of contact-pieces $r^7$ and $r^8$ in such manner that it is always in contact with one and out of contact with the other in accordance with the direction in which it is tilted. Now, a consideration of these connections will show that as soon as the battery-half $b'$ acquires by charging a potential in excess to a predetermined amount of the potential of the battery-half $b^2$, then the strength of the relay-magnet $r^5$ will overcome that of the relay magnet $r^6$ and tilt the arm $r'$ in the opposite direction to that shown in the drawing, whereby the solenoid $s^2$ is energized and the solenoid $s'$ disconnected; and this in turn will act to throw over the switch-blade $f'$ in the manner previously described, so as to disconnect the battery-half $b'$ from the primary battery $a$ and connect the battery-half $b^2$ in circuit therewith. This new state of things will then continue until, by continued charging or draft of current from the secondary battery, the potential of the battery-half $b^2$ rises to a given amount above that of the battery half $b'$, when the strength of the relay-magnet $r^6$ will overcome that of the relay-magnet $r^5$ and bring back the arm $r'$ again to its position shown in the drawing; thus disconnecting the battery-half $b^2$ from the primary battery and connecting the battery-half $b'$ therewith. Thus the charging of the two battery-halves will alternate, each being successively charged, and it is to be particularly noted that the arrangement is such as to keep the two halves evenly balanced and equally charged at all times, no matter what may happen to the battery itself such as may be produced by defective cells and the like, which would tend to reduce the potential of one half below that of the other. It is to be noted further that the excess of potential which one battery-half must have over the other to cause the throwing-over of the relay-arm $r'$ will depend on the angle at which it is tilted, because of course the attraction of that relay-armature which is nearest to its magnet will always be greatest for equal voltage. Therefore, such difference of potential as will suffice to shift the relay-arm may be determined by providing a means for increasing or decreasing the distance between said arm and the relay-magnets $r^5$ and $r^6$, such as I have illustrated as a set-screw $o$ turning in a bearing $p$ and screwed into the pivot-block $q$. By turning the screw $o$, therefore, the pivot-block $q$ may be raised and lowered and the difference of potential at which the relay will shift determined accordingly.

From the above description it will be readily seen that my invention may assume a variety of forms all embodying the same principles and that a great number of changes and modifications are possible in the nonessentials without departing from the spirit of my invention, the scope of which is particularly defined in my claims.

Having thus described my invention, what I claim as new and desire to secure by Letters Patent is:

1. A combined primary and secondary battery-system comprising, in combination, a secondary battery divided into equal halves, a primary battery having a potential proper to charge one of said halves, a service-circuit connected in series with said secondary battery, a changeover-switch adapted to connect each half of said secondary battery alternately in circuit with said primary battery, and a device operated by the difference in potential of the two halves of the secondary battery for shifting said switch.

2. A combined primary and secondary battery-system comprising, in combination, a secondary battery divided into equal halves, a primary battery having a potential proper to charge one of said halves, a service-circuit connected in series with said secondary battery, a changeover-switch adapted to connect each half of said secondary battery alternately in circuit with said primary battery, a device adapted to throw over said switch from one side to the other alternately, and means actuated by a predetermined difference in potential between the two halves of the secondary battery for operating said device.

3. A combined primary and secondary battery-system comprising, in combination, a secondary battery divided into equal halves, a primary battery having a potential proper to charge one of said halves, a service-circuit connected in series with said secondary battery, a changeover-switch adapted to connect each half of said secondary battery alternately in circuit with said primary battery, and electromagnetic means for shifting said switch alternately from one side to the other and responsive to the electrical condition of the two halves of said secondary battery.

4. A combined primary and secondary battery-system comprising, in combination, a secondary battery divided into equal halves, a primary battery having a potential proper to charge one of said halves, a service-circuit connected in series with said secondary battery, a pair of electrical devices connected to said switch and adapted one to throw it in one direction and the other in the other direction, and means actuated by the difference of potential between the two halves of said secondary battery for energizing each of said electrical devices alternately.

5. A combined primary and secondary battery-system comprising, in combination, a secondary battery divided into equal halves, a primary battery having a potential proper to charge one of said halves, a service-circuit connected in series with said secondary battery, a pair of electrical devices connected to said switch and adapted one to throw it in one direction and the other in the other direction, means actuated by the difference of potential between the two halves of said secondary battery for energizing each of said electrical devices alternately, and a relay-device adapted to energize each of said electrical devices alternately and having two relay-magnets, one of which is connected with one half of said secondary battery and the other with the other half.

6. A combined primary and secondary battery-system comprising, in combination, a secondary battery divided into equal halves, a primary battery having a potential proper to charge one of said halves, a service-circuit connected in series with said secondary battery, a changeover-switch adapted to connect each half of said secondary battery alternately in circuit with said primary battery, means actuated by a given difference of potential between the two battery-halves for throwing said switch to connect the battery-half having the lower potential with said primary battery, and means for varying the difference of potential at which said first-named means will act.

7. A combined primary and secondary battery-system comprising, in combination, a secondary battery divided into equal halves, a primary battery having a potential proper to charge one of said halves, a service-circuit connected in series with said secondary battery, a changeover-switch adapted to connect each half of said secondary battery alternately in circuit with said primary battery, a pair of electrical devices adapted when energized to throw said switch one in one direction and the other in the other direction, means actuated by a difference in potential between the two battery-halves to energize one or other of said devices and thereby change the connection of said primary battery from the secondary battery-half having the higher potential to that having the lower potential, and means for adjusting the difference of potential at which said means will act.

8. The combination of a secondary battery divided into two equal halves, a service-circuit connected in series with said battery, a primary battery having a potential suitable for charging one-half of said secondary battery, a changeover-switch adapted to connect one-half of said secondary battery in series therewith when it is thrown to one side and the other half when it is thrown to the other side, a pair of electrical devices connected to said switch and one of which is adapted to throw it to one side and the other to the other side, said electrical devices being connected to a source of electricity whereby they are energized, a shifting arm interposed in the connections between the source of electricity and the respective devices and closing the circuit of one when it is in one position and of the other when it is in the opposite position, and a pair of relay-magnets connected respectively in parallel with the two battery-halves and adapted one to throw said shifting-arm to one position and the other to the other position.

9. The combination of a secondary battery divided into two equal halves, a service-circuit connected in series with said battery, a primary battery having a potential suitable for charging one-half of said secondary battery, a changeover-switch adapted to connect one-half of said secondary battery in series therewith when it is thrown to one side and the other half when it is thrown to the other side, a pair of electrical devices connected to said switch and one of which is adapted to throw it to one side and the other to the other side, said electrical devices being connected to a source of electricity whereby they are energized, a shifting-arm interposed in the connections between the source of electricity and the respective devices and closing the circuit of one when it is in one position and of the other when it is in the opposite position, a pair of relay-magnets connected respectively in parallel with the two battery halves and adapted one to throw said shifting-arm to one position and the other to the other position and means for varying the distance of said shifting-arm from said relay-magnets whereby the difference of potential between the two battery-halves at which said shift-arm will be shifted is adjustably varied.

In witness whereof I have hereunto set my hand this 23rd day of November, 1909, in the presence of two witnesses.

JULIUS H. GUGLER.

Witnesses:
G. M. JOHNAGE,
J. C. PETERSON.